UNITED STATES PATENT OFFICE.

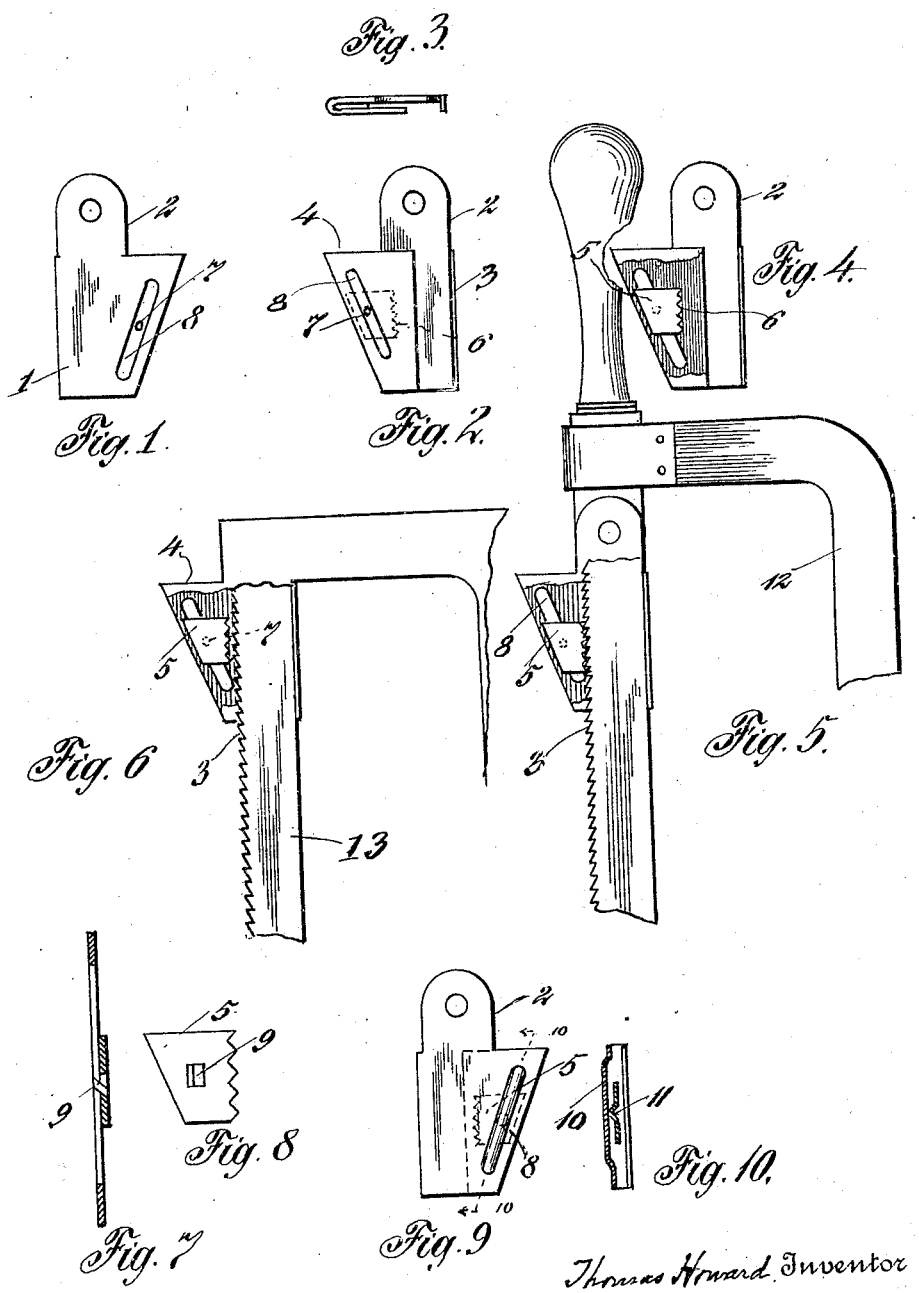

THOMAS HOWARD, OF NEW YORK, N. Y.

SAW-BLADE HOLDER.

1,410,310.  Specification of Letters Patent.  Patented Mar. 21, 1922.

Application filed December 22, 1919. Serial No. 346,660.

*To all whom it may concern:*

Be it known that I, THOMAS HOWARD, a citizen of the United States, and resident of New York, in the county of New York and State of New York, have invented a certain new and useful Saw-Blade Holder, of which the following is a specification, the same being a full, clear, and exact description of the invention, such as will enable others skilled in the art to which it appertains to make and use the same.

This invention relates to an attachment constructed and arranged to be employed in connection with the use of saw blades—such for example as those used in saws commonly designated as hack saws—by means of which attachment a saw blade, whether broken or not, may be securely fastened to and held by the frame of the saw, the said improvement comprising a support for one edge of the saw blade and an element mounted in the support to retain the other edge of the blade.

Hack saws are frequently broken in use and it has heretofore been the custom of mechanics and machinists to throw the same away and to insert a new saw blade in the saw frame. Many otherwise good saws are thus being constantly discarded, and in order to prolong the life and usefulness of such broken saw blades I have designed a support adapted to hold the broken blade and to securely clamp it in place, the same being also rigidly attached in operative position to the frame of the saw.

Another object of the invention is to provide means whereby saw blades which are not pierced at the ends thereof with orifices for retaining purposes may be used in connection with an ordinary hack saw frame. By the employment of my invention therefore economy in the manufacture of saws used therewith may be secured as no perforations at the ends of the saw blades will be necessary as would otherwise be the case.

A still further object of the invention resides in the equipping of hack saw frames with a support—comprising means to hold one edge of the saw blade and an element mounted in the support to retain the other edge of the blade—the said support being preferably permanently attached to the frame, and also preferably integral with the saw frame, whereby the said saw frame and my support may be manufactured as a unitary article.

With these and other desirable objects and purposes in view, the invention consists in the construction, arrangement and operation of parts hereinafter set forth.

In the drawings, illustrative of one embodiment of my invention, which accompany and form part of this specification, Figure 1 represents a rear elevation of an article constructed according to my invention;

Figure 2 is a front elevation thereof;

Figure 3 is an end view of the same;

Figure 4 is an elevation partly broken away to show the working parts;

Figure 5 is a view showing my support attached to a saw frame;

Figure 6 illustrates my support as made integral with a saw frame; and

Figures 7 and 10 are views in section, and Figures 8 and 9 elevations of other devices constructed according to my invention.

Referring particularly to the drawings, the reference numeral 1 denotes the rear portion of the body casing of my attachment device or saw holder having a preferably perforated extension 2 by means of which my holder may be attached to the saw supporting devices of the saw frame 12 in the ordinary and well known manner of inserting saw blades therein, or if desired the support may be riveted or otherwise permanently fastened to the saw frame, or it may be integral therewith as illustrated in Figure 6.

My attachment device is preferably made of a single piece of metal having the edges turned over toward each other, one edge 3 being preferably narrow in width and the other one 4 being of such a larger width as may be desired or deemed to be suitable for the particular purposes of use. The two edges of the support are preferably turned over toward each other at different inclinations, or so that one side of the support shall lie at an angle to the other one.

A channel is provided by turning over one of said edges—as 4—the said channel being preferably inclined as regards the other side of the support. This channel is preferably made of sufficient capacity to contain a variety of different sized saws.

The channel made by the turning over of the said edge forms a track or way on which a block or element 5 may work to and fro in a slidable reciprocatory relation, the extent of the movement of said block being governed and limited to engaging means carried by the block co-operating with guiding means formed in the body casing or in the bent or turned over part 4 of the saw holder. As a convenient means of making such engaging means so that the block will slide with respect to the guide, I provide the block 5 with a pin 7 projecting therefrom which pin may work in the guide formed by the slot 8, preferably parallel with the edge 4 and formed either in the body casing or in the bent up part 4. The slot is preferably made so as to lie in a parallel relation to the side of the support formed by turning up the edge 4—in order that as the block 5 works back and forth the top edge thereof will always be parallel with the edge 3 as it approaches and recedes therefrom—and the lower relatively angular edge of the block is preferably parallel with the side of the support formed by turning over the inclined edge 4.

Other means may be employed to serve as a guide for the movement of the block 5 within the channel formed as described, as for example the block may have a lug 9 punched out of the side of the same adapted to work in the slot 8 as shown in Figure 7, or the block may have an indentation or projection 11 extending from a side face thereof and constructed and arranged to travel in a groove or indentation 10 formed in the turned over part or body casing as illustrated in Figure 10. In either case it will be noted that the block is slidable with respect to the guide.

In order to securely retain a saw blade 13 in my support or holder I form the block 5 with a plurality of serrations 6 on the edge thereof lying opposite the edge 3 of the body casing or support which teeth are preferably of a V-shape so as to become engaged at will with those of either end of the saw blade, thus making my support a universal tool. I use a sufficient number of teeth on the block in order that at least three of the teeth of the saw blade will be engaged thereby so as to provide a solid and secure retaining means.

To attach the saw to my holder the block 5 is pushed to the wider end of the support as far as the limit of the guide will permit. The end of the saw blade 13 is then inserted in the narrow end of the wedge-like support so that the even or plain edge of the same will be adjacent to or contacted with the turned over edge 3. The blade is then pushed in a downward direction to engage the teeth of the same with the serrations of the block. By now pulling the blade toward the narrower end of the holder, the block will be moved in unison with the blade, and the latter will become securely held and rigidly clamped between the supporting edge 3 and the serrations 6 of the block 5, the engagement of the latter with the guiding means of the body casing preventing any slipping movement of the same in the practical use of my invention.

I thus provide a support for one edge of the blade of a saw and an element slidably mounted in the support to retain the edge of the blade. By the engagement of at least three serrations of the block with the teeth of the blade 13 a reliable and secure engagement of the parts is attained which might not be the case if the block had only one tooth to operatively engage the saw blade at any one time. By the use of means whereby the block is slidable with respect to the guiding means the said block gradually approaches the edge 3 in a parallel relation therewith as it travels toward the narrower end of the support. The block 5 is preferably loosely mounted in the holder so as to be freely movable therein.

By reason of the peculiar formation of the turned over edge of the support and the serrations of the block and the arrangement of the latter in an aligned relation, the support is adapted to be used with a variety of saws, and the block will engage the teeth of either end of the saw blade—broken or otherwise—that may be inserted in the support, no matter whether all of the respectively oppositely disposed teeth register with each other exactly or not, and even if some of the saw teeth have been broken away.

Inasmuch as the cramping action between one jaw formed by the edge 3 and the other jaw comprising the block 5—supported by the edge 4—is one in parallel relation and in a vertical direction and also of great width of contact, it is manifest that the said clamp will be much stronger and more reliable than any device where pivoted clamping dogs were to be employed where a single tooth alone must be relied upon to attain the cramping effect.

The advantages of the simplicity of construction of my saw blade holder and the consequent economy of manufacture will be readily seen and the durability and reliability of the same in practical use are manifest as it is practically impossible for any of the parts of the support to get out of order.

I wish it to be understood that I do not desire to be limited to the particular use or the exact details of construction shown and described, for obvious modifications will occur to persons skilled in the art.

It will be noted that, broadly stated, my attachment means comprises a support for one edge of a saw blade and an element slidably mounted therein to retain the other edge of the blade, whereby the attachment means and the blade may form per se a single, aligned and independent unit and the former may be engaged with the complementary attachment means of a saw frame at will. Thus I simply supply the blade attachment means it originally had and which has been broken off in use. By the use of my invention therefore broken saw blades may be mended in such a manner as to be capable of being inserted in a saw frame in the same manner as when they were new.

What I claim as my invention is:—

1. A broken hack saw blade support comprising a body element having supporting means for the top edge of the blade, the other and lower edge thereof being inclined to receive and support the lower edge of the blade, said support having a slot formed therein parallel to the said lower inclined edge, and a block adapted to work in the support and having a serrated edge parallel to the said upper supporting means to engage the teeth of the blade, and a lower edge parallel to the inclined supporting edge, said block also having a pin adapted to serve as a guide thereof and to work in said slot, the body element also having means for attachment to a hack saw frame.

2. A broken saw blade support comprising a body element having a straight edge and a bent over supporting means for the top edge of the blade to hold the latter so that its top edge will be in alignment with the said straight edge, the other and lower edge of the support being inclined to receive and support the lower edge of the blade, said support having a slot formed therein parallel to the said lower inclined edge, and a block adapted to work in the support and having a serrated edge parallel to the said upper supporting means to engage the teeth of the blade, and a lower edge parallel to the inclined supporting edge, said block also having a pin adapted to serve as a guide thereof and to work in said slot, the body element also having means for attachment to a hack saw frame.

3. A broken hack saw blade support having means for attachment to a hack saw frame and comprising a body element having supporting means for the top edge of the blade, the other and lower edge thereof being inclined to receive and support the lower edge of the blade, a block adopted to work in the support and having a serrated edge parallel to the said upper supporting means to engage the teeth of the blade, and a lower edge parallel to the inclined supporting edge, and means to guide the movement of the said block so that it will slide over the blade freely in one direction and will become cramped between the blade and the support upon being moved in the other direction.

4. A broken hack saw blade support having means for attachment to a hack saw frame and comprising a body element having supporting means for an edge of the block, the other edge thereof being inclined to receive and support the other edge of the blade, said support having a slot formed therein parallel to the said inclined edge, and a block adapted to work in the support and having one edge parallel to the first named supporting means to engage one edge of the blade, and a lower edge parallel to the inclined supporting edge and means to guide the movement of the said block so that it will slide over the blade freely in one direction and will become cramped between the blade and the support upon being moved in the other direction.

5. A broken hack saw blade support comprising a body element consisting of an upright wall having bent over supporting means for the top edge of the blade, the other and lower edge thereof being also bent over and inclined to receive and support the lower edge of the blade, said support having a slot formed therein parallel to the said lower inclined edge, and a block adapted to work in the support and having a serrated edge parallel to the said upper supporting means to engage the teeth of the blade, and a lower edge parallel to the inclined supporting edge, said block also having a pin adapted to serve as a guide therefor and to work in said slot and to overlap the edges thereof, the body element also having means for attachment to a hack saw frame.

Signed at New York, in the county of New York and State of New York, this 16th day of December, A. D. 1919.

THOMAS HOWARD.